United States Patent
Huh et al.

(10) Patent No.: US 9,632,347 B2
(45) Date of Patent: Apr. 25, 2017

(54) DISPLAY SUBSTRATE, MASK FOR MANUFACTURING THE SAME, AND METHOD OF MANUFACTURING THE DISPLAY SUBSTRATE

(71) Applicant: Samsung Display Co., Ltd., Yongin (KR)

(72) Inventors: Chul Huh, Yongin-si (KR); Min-Jung Kang, Incheon (KR); Chang-Hun Kwak, Suwon-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 298 days.

(21) Appl. No.: 14/148,366

(22) Filed: Jan. 6, 2014

(65) Prior Publication Data

US 2014/0232970 A1    Aug. 21, 2014

(30) Foreign Application Priority Data

Feb. 15, 2013    (KR) ........................ 10-2013-0016086

(51) Int. Cl.
  G02F 1/1333    (2006.01)
  G02F 1/1339    (2006.01)
  G02F 1/1335    (2006.01)

(52) U.S. Cl.
  CPC .... *G02F 1/133512* (2013.01); *G02F 1/13394* (2013.01); *G02F 1/133516* (2013.01); *G02F 2001/13396* (2013.01)

(58) Field of Classification Search
  CPC combination set(s) only.
  See application file for complete search history.

(56) References Cited

U.S. PATENT DOCUMENTS

| | | |
|---|---|---|
| 6,855,465 B2 | 2/2005 | Yi et al. |
| 7,616,274 B2 | 11/2009 | Ho |
| 2007/0291217 A1 | 12/2007 | Kang et al. |
| 2012/0033165 A1 | 2/2012 | Lee et al. |
| 2012/0038867 A1 | 2/2012 | Kwon et al. |

FOREIGN PATENT DOCUMENTS

| | | |
|---|---|---|
| JP | 11-212075 | 8/1999 |
| JP | 2001242467 | 9/2001 |
| JP | 2002-131759 | 9/2002 |

(Continued)

OTHER PUBLICATIONS

European Extended Search Report Issued on Jun. 18, 2014 in Patent Application No. 13194720.2.

*Primary Examiner* — Wen-Ying P Chen
(74) *Attorney, Agent, or Firm* — H.C. Park & Associates, PLC

(57) ABSTRACT

A display substrate includes a substrate and a light blocking element. The light blocking element is disposed on the substrate. The light blocking element includes a first light blocking portion, a second light blocking portion, and a column spacer portion. The first light blocking portion includes an upper surface at a first height. The second light blocking portion is disposed adjacent to the first light blocking portion. The second light blocking portion includes an upper surface at a second height. The second height is less than the first height. The column spacer portion is disposed adjacent to the second light blocking portion. The column spacer portion includes an upper surface at a third height. The third height is greater than the first height.

36 Claims, 7 Drawing Sheets

(56) References Cited

FOREIGN PATENT DOCUMENTS

| | | |
|---|---|---|
| JP | 2010-014870 | 1/2010 |
| KR | 10-2006-0017998 | 2/2006 |
| KR | 10-2008-0034545 | 4/2008 |
| KR | 10-2008-0082164 | 9/2008 |
| KR | 10-1172254 | 8/2012 |

DISPLAY SUBSTRATE, MASK FOR MANUFACTURING THE SAME, AND METHOD OF MANUFACTURING THE DISPLAY SUBSTRATE

CROSS-REFERENCE TO RELATED APPLICATION

This application claims priority from and the benefit of Korean Patent Application No. 10-2013-0016086, filed on Feb. 15, 2013, which is incorporated by reference for all purposes as if set forth herein.

BACKGROUND

Field

Exemplary embodiments relate to display technology, and more particularly to, a display substrate to improve display quality, a mask for manufacturing the display substrate, and a method of manufacturing the display substrate.

Discussion

Conventional liquid crystal displays typically include a display panel to display an image using light transmittance of a liquid crystal layer, and a light source module to provide light to the display panel. For example, the light source module may be a backlight assembly.

The display panel usually includes a first display substrate including a thin film transistor, a second display substrate including a color filter, and a liquid crystal layer disposed between the first and second display substrates. To this end, the display panel may be considered as including a display region and a non-display region. A light blocking pattern covering the non-display region is typically disposed on at least one of the first and second display substrates. In addition, a column spacer to maintain a gap between the first and second display substrates is usually disposed on at least one of the first and second display substrates.

To simplify a method of manufacturing conventional display panels, the light blocking pattern and the column spacer may be formed simultaneously in a single process. However, when the light blocking pattern and the column spacer are formed simultaneously, a boundary between the light blocking pattern and the column spacer may not be clear, such that the respective heights of the column spacers may not be uniform and a pressing characteristic of the column spacer may be deteriorated.

Therefore, there is a need for an approach that provides efficient, cost effective techniques to more clearly define a boundary between a light blocking portion and a column spacer portion, as well as to improve height uniformity between respective column spacer portions and pressing characteristics of the column spacer portions.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a display substrate including a boundary between a light blocking portion and a column spacer portion, which is defined to improve height uniformity between respective column spacer portions and pressing characteristics of the column spacer portions.

Exemplary embodiments provide a mask for manufacturing the display substrate.

Exemplary embodiments provide a method of manufacturing the display substrate.

Additional aspects will be set forth in the detailed description which follows and, in part, will be apparent from the disclosure, or may be learned by practice of the invention.

According to exemplary embodiments, a display substrate, includes: a substrate and a light blocking element. The light blocking element is disposed on the substrate. The light blocking element includes a first light blocking portion, a second light blocking portion, and a column spacer portion. The first light blocking portion includes an upper surface at a first height. The second light blocking portion is disposed adjacent to the first light blocking portion. The second light blocking portion includes an upper surface at a second height. The second height is less than the first height. The column spacer portion is disposed adjacent to the second light blocking portion. The column spacer portion includes an upper surface at a third height. The third height is greater than the first height.

According to exemplary embodiments, a display substrate, includes: a substrate and a light blocking element. The light blocking element is disposed on the substrate. The light blocking element includes a first light blocking portion, a second light blocking portion, and a column spacer portion. The first light blocking portion includes a first thickness. The second light blocking portion is disposed adjacent to the first light blocking portion. The second light blocking portion includes a second thickness less than the first thickness. The column spacer portion is disposed adjacent to the second light blocking portion. The column spacer portion protrudes with respect to the first light blocking portion.

According to exemplary embodiments, a mask, includes a first portion, a second portion, and a third portion. The first portion is configured to transmit incident light at a first transmittance. The second portion is disposed adjacent to the first portion. The second portion is configured to transmit incident light at a second transmittance less than the first transmittance. The third portion is disposed adjacent to the second portion. The third portion is configured to transmit incident light at a third transmittance greater than the first transmittance.

According to exemplary embodiments, a method, includes: forming, on a substrate, a first light blocking portion including a first thickness; forming, on the substrate, a second light blocking portion adjacent to the first light blocking portion, the second light blocking portion including a second thickness; and forming, on the display substrate, a column spacer portion adjacent to the second light blocking portion, the column spacer portion including a third thickness. The second thickness is less than the first thickness. The third thickness is greater than the first thickness.

According to exemplary embodiments, a boundary between a light blocking portion and a column spacer portion may be more clearly defined, such that height uniformity between respective column spacer portions and pressing characteristics of the column spacer portions may be improved.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
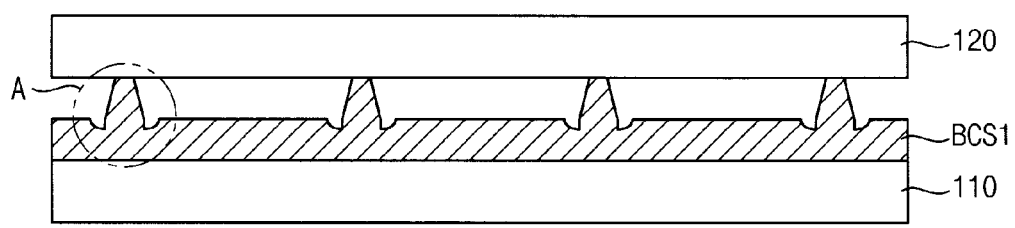
FIG. 1 is a cross-sectional view of a display panel, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes, and thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
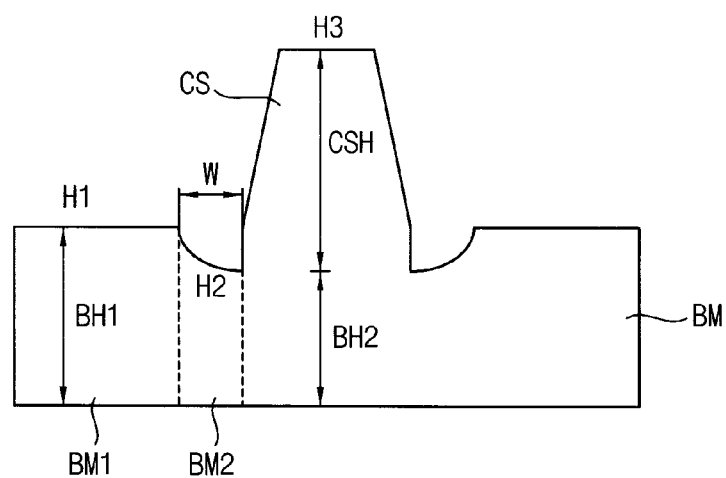
FIG. 2 is an enlarged view of portion A in FIG. 1, according to exemplary embodiments.

FIG. 1 is a cross-sectional view of a display panel, according to exemplary embodiments. FIG. 2 is an enlarged view of portion A in FIG. 1.

Referring to FIGS. 1 and 2, the display panel 100 includes a first display substrate 110 and a second display substrate 120. The display panel 100 may further include a liquid crystal layer (not shown) disposed between the first and second display substrates 110 and 120.

According to exemplary embodiments, a light blocking element BCS1 is disposed on the first display substrate 110. The light blocking element BCS1 includes a light blocking portion BM and a column spacer portion CS.

The light blocking portion BM is disposed in association with a non-display region of the display panel, and, thereby, is configured to block incident light from propagating therethrough. For example, the light blocking portion BM may be a black matrix. The column spacer portion CS may be configured to maintain a gap between the first display substrate 110 and the second display substrate 120 when the first and second display substrates 110 and 120 are combined to form the display panel.

The light blocking portion BM includes a first light blocking portion BM1 and a second light blocking portion BM2.

An upper surface of the first light blocking portion BM1 has a first height H1 from a lower surface of the light blocking portion BM. As such, the first light blocking portion BM1 has a first thickness BH1, which corresponds to the first height H1.

The second light blocking portion BM2 is disposed adjacent to the first light blocking portion BM1. An upper surface of the second light blocking portion BM2 has a variable second height H2 from the lower surface of the light blocking portion BM, which varies as the second light blocking portion BM2 extends away from the first light blocking portion BM1. For instance, the second height H2 may linearly, arcuately, stepwise, or otherwise vary as the second light blocking portion BM2 extends away from the first light blocking portion BM1. In this manner, the extent of the second height H2 may vary from the first height H1 (or first thickness BH1) to a second thickness BH2. As such, the second thickness BH2 may be less than the first thickness BH1.

The column spacer portion CS is disposed adjacent to the second light blocking portion BM2. An upper surface of the column spacer portion CS has a third height H3 from the lower surface of the light blocking portion BM. The third height H3 may be greater than the first height H1. In this manner, if the height (or thickness) of the column spacer portion CS is CSH, then the extent of the third height H3 may correspond to the height of the column spacer portion CSH plus the second thickness BH2.

According to exemplary embodiments, the first light blocking portion BM1, the second light blocking portion BM2, and the column spacer portion CS may be formed simultaneously in a single process. As such, the first light blocking portion BM1, the second light blocking portion BM2, and the column spacer portion CS may be integrally (or otherwise contiguously) formed. In this manner, the first light blocking portion BM1, the second light blocking portion BM2, and the column spacer portion CS may be (or include) the same material. It is contemplated, however, that one or more of the first light blocking portion BM1, the second light blocking portion BM2, and the column spacer portion CS may be of a different material(s) and/or connected to one or more of the other portions to form the light blocking portion BM.

In exemplary embodiments, the first light blocking portion BM1, the second light blocking portion BM2, and the column spacer portion CS may be formed in a photolithographic process. As such, the first light blocking portion BM1, the second light blocking portion BM2, and the column spacer portion CS may include a photo resist material. For example, the first light blocking portion BM1, the second light blocking portion BM2, and the column spacer portion CS may include a negative photo resist material; however, a positive photo resist material may also be utilized.

As seen in FIG. 2, as a distance of the second light blocking portion BM2 from the first light blocking portion BM1 to the column spacer portion CS increases, a depth of the second light blocking portion BM2 from the upper surface of the first light blocking portion BM1 may arcuately increase. As previously mentioned, however, the variability of the depth may vary in any other suitable manner.

A width W of the second light blocking portion BM2 and the depth of the second light blocking portion BM2 may be adjusted. The width W of the second light blocking portion BM2 may be adjusted to improve uniformity of the height CSH of the column spacer portion CS and pressing characteristics of the column spacer portion CS. For example, the width W of the second light blocking portion BM2 may be equal to or less than about 5 µm. For example, preferably, the width W of the second light blocking portion BM2 may be equal to or less than about 2 µm.

The depth of the second light blocking portion BM2 may be adjusted to affect the light blocking characteristics of the second light blocking portion BM2. For example, an optical density of the second light blocking portion BM2 may be equal to or greater than about 2.0. In this manner, depending on the optical density of the second light blocking portion BM2, the depth of the second light blocking portion BM2 may be adjusted. For instance, as the optical density increases, so too may the depth of the second light blocking portion BM2.

According to exemplary embodiments, the width W and the depth of the second light blocking portion BM2 may also be adjusted according to a width and light transmittance of a portion of a mask configured to facilitate the fabrication of the second light blocking portion BM2.

In exemplary embodiments, the second light blocking portion BM2 may surround the column spacer portion CS or otherwise be disposed on either lateral side of the column spacer portion CS, as seen in FIG. 2. To this end, the first light blocking portion BM1 may be disposed on either lateral side of the column spacer portion CS with a second light blocking portion BM2 disposed between the column spacer portion CS and a first light blocking portion BM1. It is also contemplated that the first light blocking portion BM1 may surround the column spacer portion CS, such that the second light blocking portion BM2 is disposed between the first light blocking portion BM1 and the column spacer portion CS.

According to exemplary embodiments, the column spacer portion CS may have a circular cross-sectional shape in a plan view. It is contemplated, however, that any other suitable cross-sectional shape may be utilized, such as, for instance, a square cross-sectional shape, an equilateral triangular cross-sectional shape, an anisotropic cross-sectional shape, etc. To this end, the cross-sectional size of the column spacer portion CS may vary according to the height CSH of the column spacer portion CS. For instance, the cross-sectional size of the column spacer portion CS may increase, decrease, or otherwise vary with increasing height CSH.

In exemplary embodiments, the second light blocking portion BM2 may have a corresponding cross-sectional shape that, for instance, surrounds the column spacer portion CS. For example, the second light blocking portion BM2 may have a circular cross-sectional shape that surrounds the column spacer portion CS in a plan view. It is contemplated, however, that any other suitable cross-sectional shape may be utilized, such as, for instance, a square cross-sectional shape, an equilateral triangular cross-sectional shape, an anisotropic cross-sectional shape, etc. To this end, it is noted that the cross-sectional shape of the column spacer portion CS may be different than the cross-sectional shape of the second light blocking portion BM2, yet the second light blocking portion BM2 may still surround the column spacer portion CS. In this manner, the extension of the second light blocking portion BM2 from the column spacer portion CS may vary depending on the angular disposition about the column spacer portion CS. In other words, the width W of the second light blocking portion BM2 may be different at different angular dispositions about column spacer portion CS.

According to exemplary embodiments, a plurality of column spacer portions CS may be formed on the light blocking portion BM. In this manner, the heights of the column spacer portions CS may be the same as one another. It is also contemplated, however, that some of the heights of the column spacer portions CS may be different than some other ones of the column spacer portions to account for, for example, differences in mass of an overlying display substrate, such as the second display substrate 120. In this manner, when the overlying display substrate is pressed onto the light blocking portion BM, the deformed heights of the column spacer portions CS may be the same as one another, such that the overlying display substrate (e.g., second display substrate 120) may be disposed parallel (or substantially parallel) to an underlying display substrate (e.g., first display substrate 110). Additionally (or alternatively), the variance in heights of the column spacer portions CS may be utilized to account for, for instance, zones of different pressing forces when the overlying display substrate is pressed onto the light blocking portion BM. For instance, a manufacturing apparatus utilized to press the overlying substrate onto the light blocking portion BM may exert known pressure differences, which may be accounted for via the variance in heights of the column spacer portions CS. In this manner, when the overlying display substrate is pressed onto the light blocking portion BM, the deformed heights of the column spacer portions CS may be the same as one another, such that the overlying display substrate is disposed parallel (or substantially parallel) to an underlying display substrate.

Figure 3:
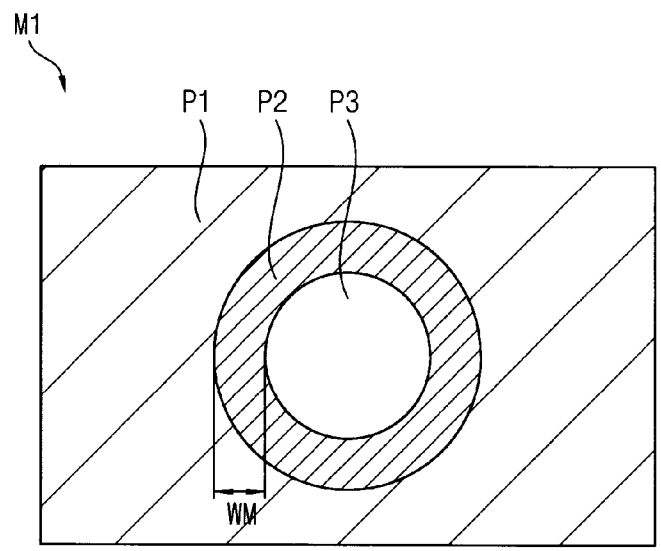
FIG. 3 is a plan view of a mask to facilitate formation of a light blocking element of the display panel of FIG. 1, according to exemplary embodiments.

FIG. 3 is a plan view of a mask to facilitate the formation of the light blocking element BCS1 of the display panel of FIG. 1, according to exemplary embodiments.

Referring to FIGS. 1-3, the mask M1 includes a first portion P1, a second portion P2, and a third portion P3. The light blocking element BCS1 may be formed via a photolithography process using the mask M1. For example, the light blocking element BCS1 may include a negative photo resist material patterned using mask M1 as a reticle in a lithographic apparatus.

The first portion P1 is shaped in correspondence with an intended shape of the first light blocking portion BM1. The first portion P1 may exhibit a first light transmittance. For example, the first portion P1 may be a halftone portion, which partially transmits incident light. For example, the first light transmittance may be about 30%.

The second portion P2 is shaped in correspondence with an intended shape of the second light blocking portion BM2. The second portion P2 is disposed adjacent to the first portion P1. The second portion P2 may exhibit a second light transmittance. In exemplary embodiments, the second light transmittance is less than the first light transmittance. For example, the second portion P2 may totally block incident light from propagating therethrough. For example, the second light transmittance may be zero.

The width W of the second light blocking portion BM2 may result from a width WM of the second portion P2. For example, the width W of the second light blocking portion BM2 may be equal to or greater than the width WM of the second portion P2 due to diffraction of light that is transmitted from the mask M1 during processing.

The third portion P3 is shaped in correspondence with an intended shape of the column spacer portion CS. The third portion P3 is disposed adjacent to the second portion P2. The third portion P3 may exhibit a third light transmittance. In exemplary embodiments, the third light transmittance may be greater than the first light transmittance. For example, the third portion P3 may totally transmit incident light. For example, the third light transmittance may be about 100%.

As seen in FIG. 3, the second portion P2 may surround the third portion P3, and the first portion P1 may surround the second portion P2. As such, the third portion P3 may be circularly shaped in a plan view, and the second portion P2 may be shaped as an annulus. It is noted, however, that depending on the intended cross-sectional shape of first light blocking portion BM1, second light blocking portion BM2, and column spacer portion CS, the respective configurations of first portion P1, second portion P2, and third portion P3 may correspond therewith.

As previously mentioned, a positive photo resist material may also be utilized in association with light blocking element BCS1. In this manner, however, the light transmittance characteristics of portions P1, P2, and P3 would be different. For instance, third portion P3 may be configured to totally block incident light, second portion P2 may be configured to transmit about 100% of incident light, and first portion P1 might be configured to transmit about 60% of incident light.

Figure 4:
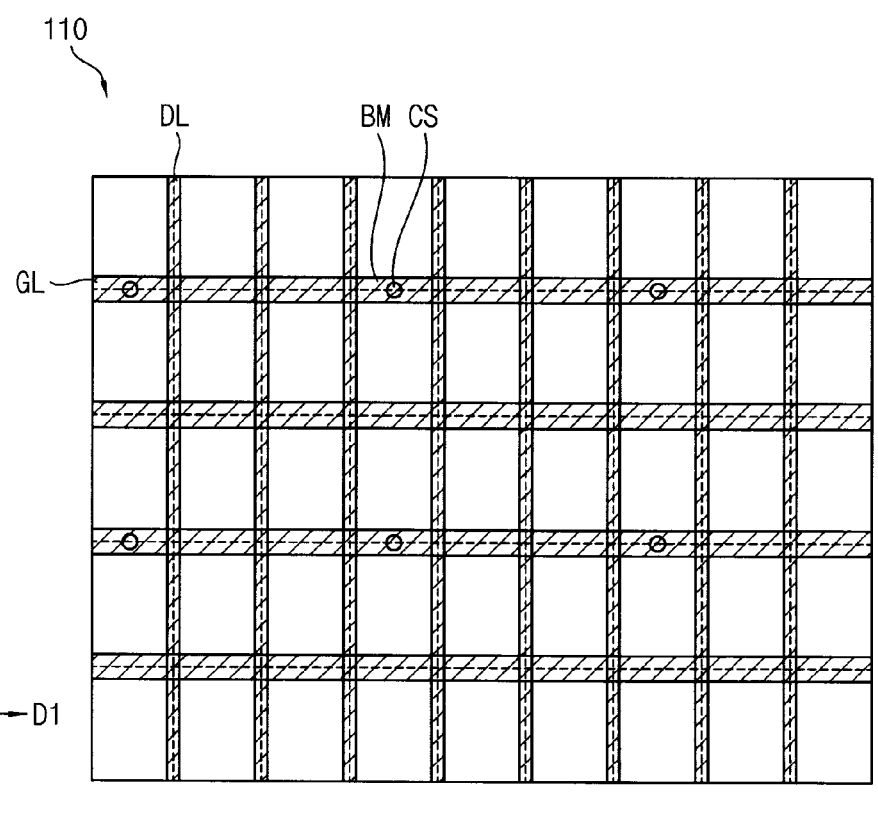
FIG. 4 is a plan view of a first display substrate of the display panel of FIG. 1, according to exemplary embodiments.

FIG. 4 is a plan view of the first display substrate 110 of FIG. 1, according to exemplary embodiments.

Referring to FIGS. 1-4, a plurality of gate lines GL and a plurality of data lines DL may be formed on the first display substrate 110. The gate line GL may extend in a first direction D1. The data line DL may extend in a second direction D2 crossing the first direction D1.

A plurality of thin film transistors (not shown) may be connected to the gate lines GL and the data lines DL, and may be formed on the first display substrate 110.

The second display substrate 120 may be a color filter substrate including a plurality of color filters configured to transmit colors in response to incident light propagating therethrough and being provided from, for instance, a light source part (not illustrated). The second display substrate 120 may include a first color filter, a second color filter, and a third color filter, as will be described in more detail in association with FIG. 10. For example, the first color filter may be a red color filter R, the second color filter may be a green color filter G, and the third color filter may be a blue color filter B. It is contemplated, however, that the second display substrate 120 may include any suitable number of color filters, as well as any other suitable color, e.g., yellow, magenta, white, etc.

According to exemplary embodiments, the light blocking element BCS1 may be disposed on the first display substrate 110. In this manner, the light blocking element BCS1 may cover the gate line GL and the data line DL. As such, the light blocking element BCS1 may include a gate light blocking portion covering the gate line GL and a data light blocking portion covering the data line DL. In exemplary embodiments, a width of the gate light blocking portion may greater than a width of the data light blocking portion; however, any other suitable widths may be utilized.

As seen in FIG. 4, the column spacer portion CS may be disposed in correspondence with the gate light blocking portion of the light blocking element BCS1. It is contemplated, however, that the column spacer portion CS may be disposed in correspondence with the data light blocking portion, the gate light blocking portion, or the data light blocking portion and the gate light blocking portion.

According to exemplary embodiments, the thin film transistors are disposed on the first display substrate 110, the color filters are disposed on the second display substrate 120, and the light blocking element BCS1 is disposed on the first display substrate 110. Alternatively, the thin film transistors and the color filter may be disposed on the first display substrate 110. As such, the light blocking element BCS1 may be disposed on the first display substrate 110, on which the thin film transistors and the color filters are disposed.

According to exemplary embodiments, the mask M1 includes the second portion P2 configured to transmit less incident light than the first portion P1. The second light blocking portion BM2 may be less thick than the first light blocking portion BM1, and may be formed in correspondence with the second portion P2 of the mask M1. As such, the boundary between the light blocking portion BM and the column spacer portion CS may be clearly defined so that the height uniformity of the column spacer portions CS may be improved. In this manner, processing management of the column spacer portion CS may become easier, the height CSH of the column spacer portion CS may increase, and the pressing characteristics of the column spacer portion CS may be improved.

Figure 5:
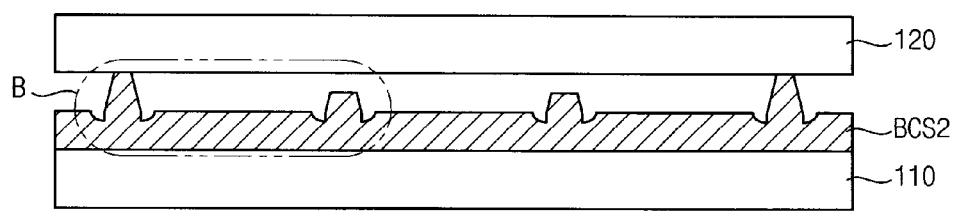
FIG. 5 is a cross-sectional view of a display panel, according to exemplary embodiments.
Figure 6:
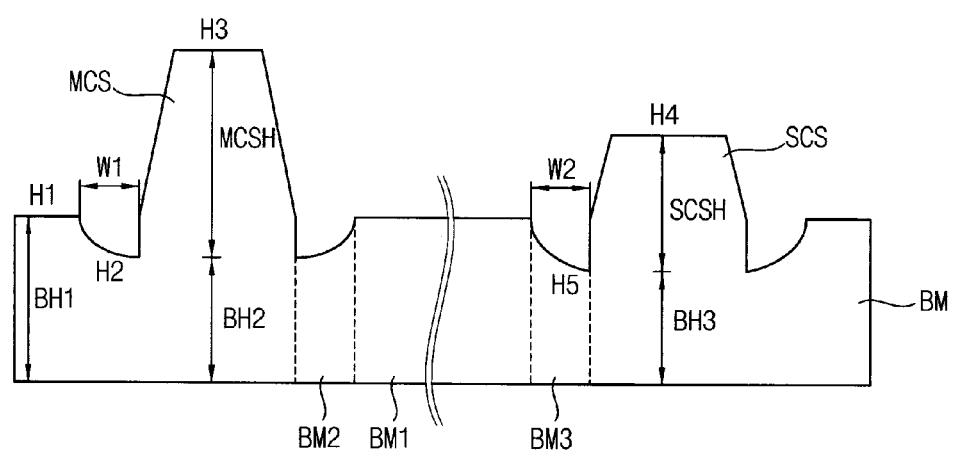
FIG. 6 is an enlarged view of portion B in FIG. 5, according to exemplary embodiments.

FIG. 5 is a cross-sectional view of a display panel, according to exemplary embodiments. FIG. 6 is an enlarged view of portion B in FIG. 5.

The display substrate, the mask for manufacturing the display substrate, and the method of manufacturing the display substrate as shown in FIGS. 5 and 6 are substantially the same as the display substrate, the mask for manufacturing the display substrate, and the method of manufacturing the display substrate of FIGS. 1-4 except that a main column spacer portion and a sub-column spacer portion are formed on the first display substrate 110 of FIGS. 5 and 6. As such, the same reference numerals will be used to refer to the same or like parts as those described in FIGS. 1-4, and to avoid obscuring exemplary embodiments disclosed herein, repetitive explanations will be omitted.

Referring to FIGS. 5 and 6, the display panel includes a first display substrate 110 and a second display substrate 120. The display panel may further include a liquid crystal layer (not shown) disposed between the first and second display substrates 110 and 120.

According to exemplary embodiments, a light blocking element BCS2 is disposed on the first display substrate 110. The light blocking element BCS2 includes a light blocking portion BM, a first column spacer portion MCS, and a second column spacer portion SCS.

The light blocking portion BM includes a first light blocking portion BM1, a second light blocking portion BM2, and a third light blocking portion BM3.

An upper surface of the first light blocking portion BM1 has a first height H1 from a lower surface of the light blocking portion BM. As such, the first light blocking portion BM1 has a first thickness BH1, which corresponds to the first height H1.

The second light blocking portion BM2 is disposed adjacent to the first light blocking portion BM1. An upper surface of the second light blocking portion BM2 has a variable second height H2 from the lower surface of the light blocking portion BM, which varies as the second light blocking portion BM2 extends away from the first light blocking portion BM1 towards the first column spacer portion MCS. For instance, the second height H2 may linearly, arcuately, stepwise, or otherwise vary as the second light blocking portion BM2 extends away from the first light blocking portion BM1. In this manner, the extent of the second height H2 may vary from the first height H1 (or first thickness BH1) to a second thickness BH2. As such, the second thickness BH2 may be less than the first thickness BH1.

The first column spacer portion MCS is disposed adjacent to the second light blocking portion BM2. An upper surface of the first column spacer portion MCS has a third height H3 from the lower surface of the light blocking portion BM. The third height H3 may be greater than the first height H1. In this manner, if the height (or thickness) of the first column spacer portion MCS is MCSH, then the extent of the third height H3 may correspond to the height of the first column spacer portion MCSH plus the second thickness BH2.

According to exemplary embodiments, an upper surface of the second column spacer portion SCS has a fourth height H4 from the lower surface of the light blocking portion BM. The fourth height H4 may be greater than the first height H1. The fourth height H4 may be less than the third height H3. In this manner, if the height (or thickness) of the second column spacer portion SCS is SCSH, then the extent of the fourth height H4 may correspond to the height of the second column spacer portion SCSH plus the third thickness BH3. In exemplary embodiments, the first column spacer portion MCS may be a main column spacer portion and the second column spacer portion SCS may be a sub-column spacer portion.

According to exemplary embodiments, the third light blocking portion BM3 may be disposed between the first light blocking portion BM1 and the second column spacer portion SCS. An upper surface of the third light blocking portion BM3 has a variable fifth height H5 from the lower surface of the light blocking portion BM, which varies as the third light blocking portion BM3 extends away from the first light blocking portion BM1 towards the second column spacer portion SCS. For instance, the fifth height H5 may linearly, arcuately, stepwise, or otherwise vary as the third light blocking portion BM2 extends away from the first light blocking portion BM1. In this manner, the extent of the fifth height H5 may vary from the first height H1 (or first thickness BH1) to a third thickness BH3. As such, the third thickness BH3 may be less than the first thickness BH1. The third thickness BH3 may also be less than the second thickness BH2.

As seen in FIG. 6, as a distance of the second light blocking portion BM2 from the first light blocking portion BM1 to the first column spacer portion MCS increases, a depth of the second light blocking portion BM2 from the upper surface of the first light blocking portion BM1 may arcuately increase. Similarly, as a distance of the third light blocking portion BM3 from the first light blocking portion BM1 to the second column spacer portion SCS increases, a depth of the third light blocking portion BM3 from the upper surface of the first light blocking portion BM1 may arcuately increase. As previously mentioned, however, the variability of the respective depths of the second light blocking member BM2 and/or the third light blocking member BM3 may vary in any other suitable manner.

A width W1 of the second light blocking portion BM2 and the depth of the second light blocking portion BM2 may be adjusted. For example, the width W1 of the second light blocking portion BM2 may be equal to or less than about 5 µm. For example, preferably, the width W1 of the second light blocking portion BM2 may be equal to or less than about 2 µm.

A width W2 of the third light blocking portion BM3 and the depth of the third light blocking portion BM3 may be properly adjusted. For example, the width W2 of the third light blocking portion BM3 may be equal to or less than about 5 µm. For example, preferably, the width W2 of the third light blocking portion BM3 may be equal to or less than about 2 µm. To this end, the width W2 of the third light blocking portion BM3 may be substantially the same as the width W1 of the second light blocking portion BM2. It is contemplated, however, that the respective widths of the second light blocking portion BM2 and the third light blocking portion BM3 may be different. In exemplary embodiments, the depth of the third light blocking portion BM3 may be greater than the depth of the second light blocking portion BM2. It is also contemplated that the depth of the third light blocking portion BM3 may be less than or equal to the depth of the second light blocking portion BM2.

The depth of the second light blocking portion BM2 and/or the third light blocking portion BM3 may be adjusted to affect the light blocking characteristics of the second light blocking portion BM2 and/or the third light blocking portion BM3. For example, an optical density of the second light blocking portion BM2 and/or the third light blocking portion BM3 may be equal to or greater than about 2.0. In this manner, depending on the optical density of the second light blocking portion BM2 and the third light blocking member, the depth of the second light blocking portion BM2 and/or the third light blocking member BM3 may be adjusted. For instance, as the optical density increases, so too may the depth of the second light blocking portion BM2 and/or the third light blocking member BM3.

According to exemplary embodiments, the respective widths W1 and W2, as well as the respective depths of the second light blocking portion BM2 and the third light blocking member BM3 may also be adjusted according to a width and light transmittance of a portion of a mask configured to facilitate the fabrication of the second light blocking portion BM2 and the third light blocking member BM3.

In exemplary embodiments, the third light blocking portion BM3 may surround the second column spacer portion SCS or otherwise be disposed on either lateral side of the second column spacer portion SCS, as seen in FIG. 6. To this end, the first light blocking portion BM1 may be disposed on either lateral side of the second column spacer portion SCS with a third light blocking portion BM3 disposed between the second column spacer portion SCS and a first light blocking member BM1. It is also contemplated that the first light blocking portion BM1 may surround the second column spacer portion SCS, such that the third light blocking portion BM3 is disposed between the first light blocking portion BM1 and the second column spacer portion SCS.

According to exemplary embodiments, the second column spacer portion SCS may have a circular cross-sectional shape in a plan view. It is contemplated, however, that any other suitable cross-sectional shape may be utilized, such as, for instance, a square cross-sectional shape, an equilateral triangular cross-sectional shape, an anisotropic cross-sectional shape, etc. To this end, the cross-sectional size of the second column spacer portion SCS may vary according to the height SCSH of the second column spacer portion SCS. For instance, the cross-sectional size of the second column spacer portion SCS may increase, decrease, or otherwise vary with increasing height SCSH.

According to exemplary embodiments, the cross-sectional shape of the second column spacer portion SCS may be different than the cross-sectional shape of the third light blocking portion BM3, yet the third light blocking portion BM3 may still surround the second column spacer portion SCS. In this manner, the extension of the third light blocking portion BM3 from the second column spacer portion SCS may vary depending on the angular disposition about the second column spacer portion SCS. In other words, the width W2 of the third light blocking portion BM3 may be different at different angular dispositions about second column spacer portion SCS.

Figure 7:
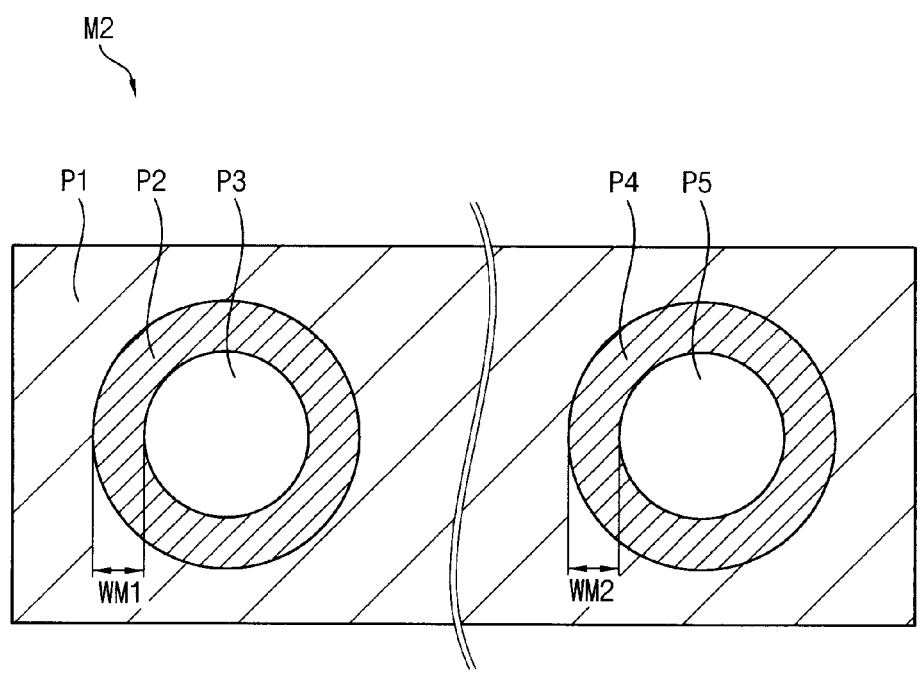
FIG. 7 is a plan view of a mask to facilitate formation of a light blocking element of the display panel of FIG. 5, according to exemplary embodiments.

FIG. 7 is a plan view of a mask to facilitate formation of the light blocking element BCS2 of the display panel of FIG. 5, according to exemplary embodiments.

Referring to FIGS. 5-7, the mask M2 includes a first portion P1, a second portion P2, a third portion P3, a fourth portion P4, and a fifth portion P5. The light blocking element BCS2 may be formed via a photolithography process using the mask M2. For example, the light blocking element BCS2 may include a negative photo resist material patterned using mask M2 as a reticle in a lithographic apparatus; however, a positive photo resist material may also be utilized.

The first portion P1 is shaped in correspondence with an intended shape of the first light blocking portion BM1. The first portion P1 may exhibit a first light transmittance. For example, the first portion P1 may be a first halftone portion, which partially transmits incident light. For example, the first light transmittance may be about 30%.

The second portion P2 is shaped in correspondence with an intended shape of the second light blocking portion BM2. The second portion P2 is disposed adjacent to the first portion P1. The second portion P2 may exhibit a second light transmittance. In exemplary embodiments, the second light transmittance may be less than the first light transmittance. For example, the second portion P2 may totally block incident light from propagating therethrough. For example, the second light transmittance may be zero.

The width W1 of the second light blocking portion BM2 may result from a width WM1 of the second portion P2. For example, the width W1 of the second light blocking portion BM2 may be equal to or greater than the width WM1 of the second portion P2 due to diffraction of light that is transmitted from the mask M2 during processing.

The third portion P3 is shaped in correspondence with an intended shape of the first column spacer portion MCS. The third portion P3 is disposed adjacent to the second portion P2. The third portion P3 may exhibit a third light transmittance. In exemplary embodiments, the third light transmittance may be greater than the first light transmittance. For example, the third portion P3 may totally transmit incident light. For example, the third light transmittance may be about 100%.

The fourth portion P4 is shaped in corresponding with an intended shape of the third light blocking portion BM3. The fourth portion P4 is disposed adjacent to the first portion P1. The fourth portion P4 may exhibit a fourth light transmittance. In exemplary embodiments, the fourth light transmittance may be less than the first light transmittance. For example, the fourth light transmittance may be substantially the same as the second light transmittance. For example, the fourth portion P4 may totally block incident light from propagating therethrough. For example, the fourth light transmittance may be zero.

The width W2 of the third light blocking portion BM3 may result from a width WM2 of the fourth portion P4. For example, the width W2 of the third light blocking portion BM3 may be equal to or greater than the width WM2 of the fourth portion P4 due to diffraction of light that is transmitted from the mask M2 during processing.

The fifth portion P5 is shaped in correspondence with an intended shape of the second column spacer portion SCS. The fifth portion P5 is disposed adjacent to the fourth portion P4. The fifth portion P5 may exhibit a fifth light transmittance. In exemplary embodiments, the fifth light transmittance may be greater than the first light transmittance. For example, the fifth light transmittance may be less than the third light transmittance. For example, the fifth portion P5 may be a second halftone portion, which partially transmits incident light. In this manner, the fifth light transmittance may be about 47%.

According to exemplary embodiments, the depth of the third light blocking portion BM3 may be greater than the second light blocking portion BM2. The fifth light transmittance of the fifth portion P5 may be less than the third light transmittance of the third portion P3 so that light leakage on the fourth portion P4 adjacent to the fifth portion P5 is less than light leakage on the second portion P2 adjacent to the third portion P3. As such, the third light blocking portion BM3 may be formed deeper than the second light blocking portion BM2.

As seen in FIG. 7, the fourth portion P4 may surround the fifth portion P5, and the first portion P1 may surround the fourth portion P4. As such, the fifth portion P5 may be circularly shaped in a plan view, and the fourth portion P4 may be shaped as an annulus. It is noted, however, that depending on the intended cross-sectional shape of first light blocking portion BM1, third light blocking portion BM3, and second column spacer portion SCS, the respective configurations of first portion P1, fourth portion P4, and fifth portion P5 may correspond therewith.

Adverting to FIG. 4, according to exemplary embodiments, the light blocking element BCS2 may be disposed on the first display substrate 110. In this manner, the light blocking element BCS2 may cover the gate line GL and the data line DL. As such, the light blocking element BCS2 may include a gate light blocking portion covering the gate line GL and a data light blocking portion covering the data line DL. In exemplary embodiments, a width of the gate light blocking portion may greater than a width of the data light blocking portion; however, any other suitable widths may be utilized.

According exemplary embodiments, the mask M2 includes the second portion P2 and the fourth portion P4 both being configured to transmit less incident light than the first portion P1. The second light blocking portion BM2 and the third light blocking portion BM3 may be less thick than the first light blocking portion BM1, and may be respectively formed in correspondence with the second portion P2 and the fourth portion P4 of the mask M2. As such, the corresponding boundaries between the light blocking portion BM and the first and second column spacer portions MCS and SCS may be clearly defined so that the height uniformity of the first and second column spacer portions MCS and SCS may be improved. In this manner, processing management of the first and second column spacer portions MCS and SCS may become easier, the respective heights MCSH and SCSH of the first and second column spacer portions MCS and SCS may increase, and the pressing characteristics of the first and second column spacer portions MCS and SCS may be improved.

As previously mentioned, a positive photo resist material may also be utilized in association with light blocking element BCS2. In this manner, however, the light transmittance characteristics of portions P1, P2, P3, P4, and P5 would be different. For instance, third portion P3 may be configured to totally block incident light, second portion P2 may be configured to transmit about 100% of incident light, and first portion P1 might be configured to transmit about 60% of incident light. To this end, the fourth portion P4 may be configured to transmit about 100% of incident light, and the fifth portion P5 may be configured to transmit less incident light than the first portion P1.

Figure 8:
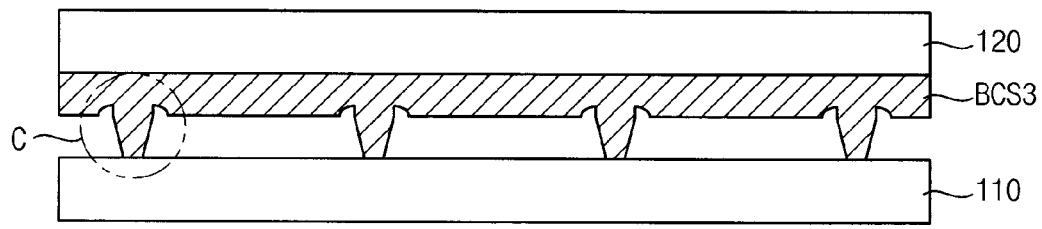
FIG. 8 is a cross-sectional view of a display panel, according to exemplary embodiments.
Figure 9:
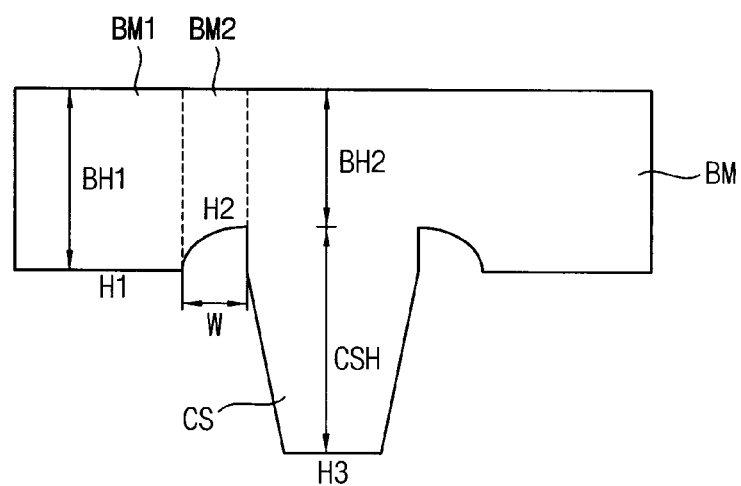
FIG. 9 is an enlarged view of portion C in FIG. 8, according to exemplary embodiments.

FIG. 8 is a cross-sectional view of a display panel, according to exemplary embodiments. FIG. 9 is an enlarged view of portion C in FIG. 8.

The display substrate, the mask for manufacturing the display substrate, and the method of manufacturing the display substrate as shown in FIGS. 8 and 9 are substantially the same as the display substrate, the mask for manufacturing the display substrate, and the method of manufacturing the display substrate of FIGS. 1-4 except that the light blocking element of FIGS. 8 and 9 is disposed on the second display substrate 120. As such, the same reference numerals will be used to refer to the same or like parts as those described in FIGS. 1-4, and to avoid obscuring exemplary embodiments disclosed herein, repetitive explanations will be omitted.

Referring to FIGS. 3, 8 and 9, the display panel includes a first display substrate 110 and a second display substrate 120. The display panel may further include a liquid crystal layer (not shown) disposed between the first and second display substrates 110 and 120.

According to exemplary embodiments, a light blocking element BCS3 is disposed on the second display substrate 120. The light blocking element BCS3 includes a light blocking portion BM and a column spacer portion CS.

The light blocking portion BM includes a first light blocking portion BM1 and a second light blocking portion BM2.

An upper surface of the first light blocking portion BM1 has a first height H1 from a lower surface of the light blocking portion BM. As such, the first light blocking portion BM1 has a first thickness BH1, which corresponds to the first height H1.

The second light blocking portion BM2 is disposed adjacent to the first light blocking portion BM1. An upper surface of the second light blocking portion BM2 has a variable second height H2 from the lower surface of the light blocking portion BM, which varies as the second light blocking portion BM2 extends away from the first light blocking portion BM1. For instance, the second height H2 may linearly, arcuately, stepwise, or otherwise vary as the second light blocking portion BM2 extends away from the first light blocking portion BM1. In this manner, the extent of the second height H2 may vary from the first height H1

(or first thickness BH1) to a second thickness BH2. As such, the second thickness BH2 may be less than the first thickness BH1.

The column spacer portion CS is disposed adjacent to the second light blocking portion BM2. An upper surface of the column spacer portion CS has a third height H3 from the lower surface of the light blocking portion BM. The third height H3 may be greater than the first height H1. In this manner, if the height (or thickness) of the column spacer portion CS is CSH, then the extent of the third height H3 may correspond to the height of the column spacer portion CSH plus the second thickness BH2.

According to exemplary embodiments, the light blocking element BCS3 may be formed via a photolithography process using the mask M1 illustrated in FIG. 3. The mask M1 includes the first portion P1 shaped in correspondence with an intended shape of the first light blocking portion BM1, the second portion P2 shaped in correspondence with an intended shape of the second light blocking portion BM2, and the third portion P3 shaped in correspondence with an intended shape of the column spacer portion CS.

Figure 10:
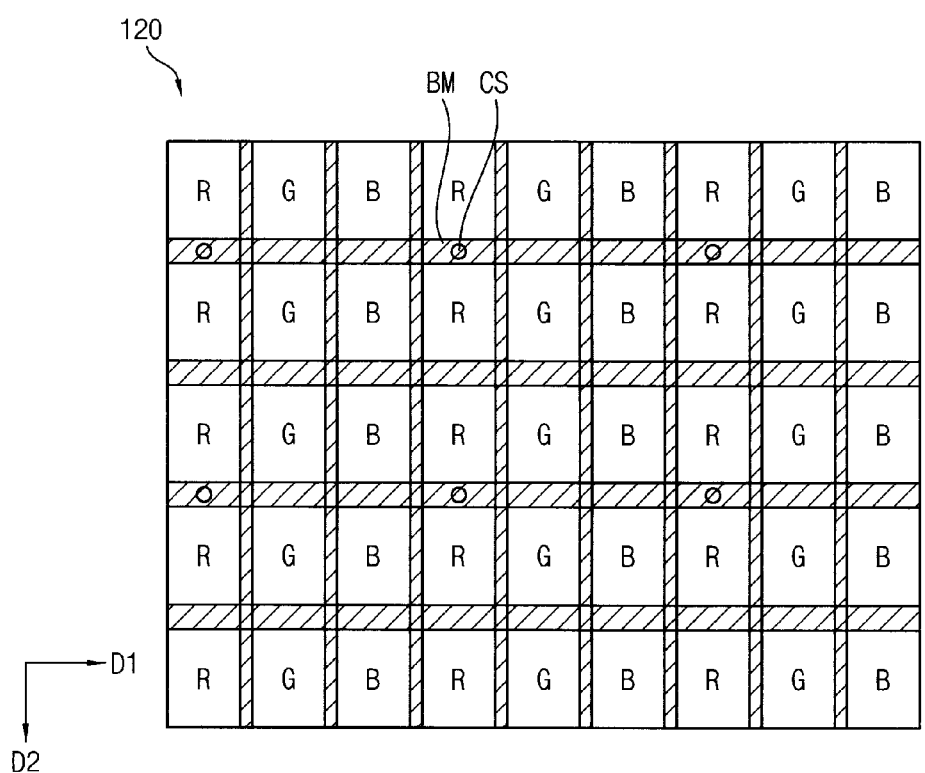
FIG. 10 is a plan view of a second display substrate of the display panel of FIG. 8, according to exemplary embodiments.

FIG. 10 is a plan view of the second display substrate 120 of FIG. 8, according to exemplary embodiments.

Referring to FIGS. 4 and 8-10, a plurality of gate lines GL and a plurality of data lines DL may be formed on the first display substrate 110. While not illustrated, a plurality of thin film transistors connected to the gate lines GL and the data lines DL may also be formed on the first display substrate 110.

The second display substrate 120 may be a color filter substrate including a plurality of color filters configured to transmit colors in response to incident light propagating therethrough and being provided from, for instance, a light source part (not illustrated). The second display substrate 120 may include a first color filter, a second color filter, and a third color filter. For example, the first color filter may be a red color filter R, the second color filter may be a green color filter G, and the third color filter may be a blue color filter B. It is contemplated, however, that the second display substrate 120 may include any suitable number of color filters, as well as any other suitable color, e.g., yellow, magenta, white, etc.

According to exemplary embodiments, the light blocking element BCS3 may be disposed on the second display substrate 120. In this manner, the light blocking element BCS3 may cover boundaries between the color filters R, G and B. For example, the light blocking element BCS3 may cover boundaries between the color filters R, G and B along a first direction D1, and the light blocking element BCS3 may cover boundaries between the color filters R, G and B along a second direction D2 crossing the first direction D1.

In exemplary embodiments, the light blocking element BCS3 may include a gate light blocking portion corresponding to the gate line GL of the first display substrate 110 and a data light blocking portion corresponding to the data line DL of the first display substrate 110. According to exemplary embodiments, a width of the gate light blocking portion may greater than a width of the data light blocking portion. As such, the light blocking element BCS3 may be disposed over the gate lines GL and the data lines DL when the second display substrate 120 disposed on the first display substrate 110.

As seen in FIG. 10, the column spacer portion CS may be disposed in correspondence with the gate light blocking portion of the light blocking element BCS3. It is contemplated, however, that the column spacer portion CS may be disposed in correspondence with the data light blocking portion, the gate light blocking portion, or the data light blocking portion and the gate light blocking portion.

According to exemplary embodiments, the thin film transistors are disposed on the first display substrate 110, the color filters are disposed on the second display substrate 120, and the light blocking element BCS3 is disposed on the second display substrate 120. Alternatively, the thin film transistors and the color filter may be disposed on the second display substrate 120. As such, the light blocking element BCS3 may be disposed on the second display substrate 120, on which the thin film transistors and the color filters are disposed.

According to exemplary embodiments, the mask M1 includes the second portion P2 configured to transmit less incident light than the first portion P1. The second light blocking portion BM2 may be less thick than the first light blocking portion BM1, and may be formed in correspondence with the second portion P2 of the mask M1. As such, the boundary between the light blocking portion BM and the column spacer portion CS may be clearly defined so that the height uniformity of the column spacer portions CS may be improved. In this manner, processing management of the column spacer portion CS may become easier, the height CSH of the column spacer portion CS may increase, and the pressing characteristics of the column spacer portion CS may be improved.

Figure 11:
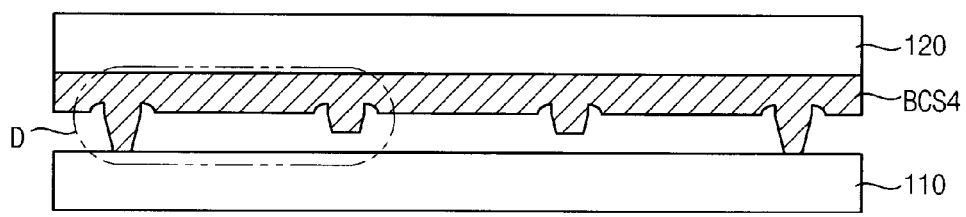
FIG. 11 is a cross-sectional view of a display panel, according to exemplary embodiments.
Figure 12:
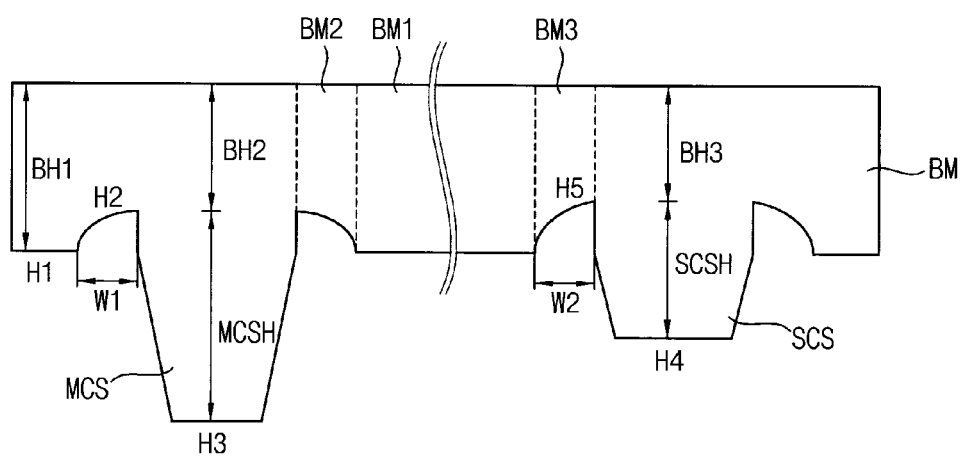
FIG. 12 is an enlarged view of portion D in FIG. 11, according to exemplary embodiments.

FIG. 11 is a cross-sectional view of a display panel, according to exemplary embodiments. FIG. 12 is an enlarged view of portion D in FIG. 11.

The display substrate, the mask for manufacturing the display substrate, and the method of manufacturing the display substrate as shown in FIGS. 11 and 12 are substantially the same as the display substrate, the mask for manufacturing the display substrate, and the method of manufacturing the display substrate of FIGS. 5-7 except that a main column spacer portion and a sub-column spacer portion are formed on the second display substrate 120 of FIGS. 11 and 12. As such, the same reference numerals will be used to refer to the same or like parts as those described in FIGS. 5-7, and to avoid obscuring exemplary embodiments disclosed herein, repetitive explanations will be omitted.

Referring to FIGS. 7 and 10-12, the display panel includes a first display substrate 110 and a second display substrate 120. The display panel may further include a liquid crystal layer (not shown) disposed between the first and second display substrates 110 and 120.

According to exemplary embodiments, a light blocking element BCS4 is disposed on the second display substrate 120. The light blocking element BCS4 includes a light blocking portion BM, a first column spacer portion MCS, and a second column spacer portion SCS.

The light blocking portion BM includes a first light blocking portion BM1, a second light blocking portion BM2, and a third light blocking portion BM3.

An upper surface of the first light blocking portion BM1 has a first height H1 from a lower surface of the light blocking portion BM. As such, the first light blocking portion BM1 has a first thickness BH1, which corresponds to the first height H1.

The second light blocking portion BM2 is disposed adjacent to the first light blocking portion BM1. An upper surface of the second light blocking portion BM2 has a variable second height H2 from the lower surface of the light blocking portion BM. The second height H2 is less than the first height H1, which varies as the second light blocking portion BM2 extends away from the first light blocking portion BM1 towards the first column spacer portion MCS.

For instance, the second height H2 may linearly, arcuately, stepwise, or otherwise vary as the second light blocking portion BM2 extends away from the first light blocking portion BM1. In this manner, the extent of the second height H2 may vary from the first height H1 (or thickness BH1) to a second thickness BH2. As such, the second thickness BH2 may be less than the first thickness BH1.

The first column spacer portion MCS is disposed adjacent to the second light blocking portion BM2. An upper surface of the first column spacer portion MCS has a third height H3 from the lower surface of the light blocking portion BM. The third height H3 may be greater than the first height H1. In this manner, if the height (or thickness) of the first column spacer portion MCS is MCSH, then the extent of the third height H3 may correspond to the height of the first column spacer portion MCSH plus the second thickness BH2.

According to exemplary embodiments, an upper surface of the second column spacer portion SCS has a fourth height H4 from the lower surface of the light blocking portion BM. The fourth height H4 may be greater than the first height H1. The fourth height H4 may be less than the third height H3. In this manner, if the height (or thickness) of the second column spacer portion SCS is SCSH, then the extent of the fourth height H4 may correspond to the height of the second column spacer portion SCSH plus the third thickness BH3. In exemplary embodiments, the first column spacer portion MCS may be a main column spacer portion and the second column spacer portion SCS may be a sub-column spacer portion.

According to exemplary embodiments, the third light blocking portion BM3 may be disposed between the first light blocking portion BM1 and the second column spacer portion SCS. An upper surface of the third light blocking portion BM3 has a variable fifth height H5 from the lower surface of the light blocking portion BM, which varies as the third light blocking portion BM3 extends away from the first light blocking portion BM1 towards the second column spacer portion SCS. For instance, the fifth height H5 may linearly, arcuately, or stepwise, otherwise vary as the third light blocking portion BM2 extends away from the first light blocking portion BM1. In this manner, the extent of the fifth height H5 may vary from the first height H1 (or first thickness BH1) to a third thickness BH3. As such, the third thickness BH3 may be less than the first thickness BH1. The third thickness BH3 may be less than the second thickness BH2.

In exemplary embodiments, the light blocking element BCS4 may be formed via a photolithography process using the mask M2 of FIG. 7. The mask M2 includes the first portion P1 shaped in correspondence with an intended shape of the first light blocking portion BM1, the second portion P2 shaped in correspondence with an intended shape of the second light blocking portion BM2, the third portion P3 shaped in correspondence with an intended shape of the first column spacer portion MCS, the fourth portion P4 shaped in correspondence with an intended shape of the third light blocking portion BM3, and the fifth portion P5 shaped in correspondence with an intended shape of the second column spacer portion SCS.

Adverting to FIG. 10, according to exemplary embodiments, the light blocking element BCS4 may be disposed on the second display substrate 120. In this manner, the light blocking element BCS4 may cover boundaries between the color filters R, G and B. In exemplary embodiments, the light blocking element BCS4 may include a gate light blocking portion corresponding to the gate line GL of the first display substrate 110 and a data light blocking portion corresponding to the data line DL of the first display substrate 110. According to exemplary embodiments, a width of the gate light blocking portion may greater than a width of the data light blocking portion. As such, the light blocking element BCS4 may be disposed over the gate lines GL and the data lines DL when the second display substrate 120 is disposed on the first display substrate 110.

As seen in FIG. 10, the first column spacer portion MCS and the second column spacer portion SCS may be disposed in correspondence with the gate light blocking portion of the light blocking element BCS4. It is contemplated, however, that the first column spacer portion MCS and the second column spacer portion SCS may be disposed in correspondence with the data light blocking portion, the gate light blocking portion, or the data light blocking portion and the gate light blocking portion.

According to the present exemplary embodiment, the mask M2 includes the second portion P2 and the fourth portion P4 both being configured to transmit less incident light than the first portion P1. The second light blocking portion BM2 and the third light blocking portion BM3 may be less thick than the first light blocking portion BM1, and may be respectively formed in correspondence with the second portion P2 and the fourth portion P4 of the mask M2. As such, the corresponding boundaries between the light blocking portion BM and the first and second column spacer portions MCS and SCS may be clearly defined so that the height uniformity of the first and second column spacer portions MCS and SCS may be improved. In this manner, processing management of the first and second column spacer portions MCS and SCS may become easier, the respective heights MCSH and SCSH of the first and second column spacer portions MCS and SCS may increase, and the pressing characteristics of the first and second column spacer portions MCS and SCS may be improved.

According to exemplary embodiments, a display substrate includes a boundary between a light blocking portion and a column spacer portion, which may be defined more clearly. As such, height uniformity the column spacer portions and pressing characteristics of the column spacer portions may be improved.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A display substrate, comprising:
   a substrate; and
   a light blocking element disposed on the substrate, the light blocking element comprising:
      a first light blocking portion comprising an upper surface at a first height;
      a second light blocking portion disposed adjacent to the first light blocking portion, the second light blocking portion comprising an upper surface at a second height, the second height being less than the first height; and
      a column spacer portion disposed adjacent to the second light blocking portion, the column spacer portion comprising an upper surface at a third height, the third height being greater than the first height,
   wherein the second light blocking portion surrounds the column spacer portion, and wherein the first light blocking portion surrounds the second light blocking portion.

2. The display substrate of claim 1, wherein:
the second light blocking portion integrally extends from the column spacer portion; and
the first light blocking portion integrally extends from the second light blocking portion.

3. The display substrate of claim 1, wherein the second light blocking portion comprises a variable height that varies as the second light blocking portion extends from the first light blocking portion towards the column spacer portion.

4. The display substrate of claim 1, wherein the column spacer portion comprises a circular cross-sectional shape.

5. The display substrate of claim 1, further comprising:
a gate line disposed on the substrate; and
a data line disposed on the substrate,
wherein the light blocking element covers the gate line and the data line.

6. The display substrate of claim 5, wherein the column spacer portion is disposed on the gate line.

7. The display substrate of claim 1, further comprising:
color filters disposed on the substrate,
wherein the light blocking element covers respective boundaries between the color filters.

8. The display substrate of claim 3, wherein the variable height arcuately varies between the first height and the second height.

9. A display substrate, comprising:
a substrate; and
a light blocking element disposed on the substrate, the light blocking element comprising:
a first light blocking portion comprising an upper surface at a first height;
a second light blocking portion disposed adjacent to the first light blocking portion, the second light blocking portion comprising an upper surface at a second height, the second height being less than the first height; and
a column spacer portion disposed adjacent to the second light blocking portion, the column spacer portion comprising an upper surface at a third height, the third height being greater than the first height,
wherein a width of the second light blocking portion is equal to or less than 5 μm.

10. A display substrate, comprising:
a substrate; and
a light blocking element disposed on the substrate, the light blocking element comprising:
a first light blocking portion comprising an upper surface at a first height;
a second light blocking portion disposed adjacent to the first light blocking portion, the second light blocking portion comprising an upper surface at a second height, the second height being less than the first height;
a column spacer portion disposed adjacent to the second light blocking portion, the column spacer portion comprising an upper surface at a third height, the third height being greater than the first height; and
a second column spacer portion comprising an upper surface at a fourth height, the fourth height being greater than the first height and less than the third height.

11. The display substrate of claim 10, wherein the light blocking element further comprises:
a third light blocking portion disposed between the first light blocking portion and the second column spacer portion.

12. The display substrate of claim 11, wherein the third light blocking portion comprises a variable height that varies as the third light blocking portion extends from the first light blocking portion towards the second column spacer portion.

13. The display substrate of claim 11, wherein a width of the third light blocking portion is equal to or less than 5 μm.

14. The display substrate of claim 11, wherein the third light blocking portion comprises an upper surface at a fifth height, the fifth height being less than the second height.

15. A display substrate, comprising:
a substrate; and
a light blocking element disposed on the substrate, the light blocking element comprising:
a first light blocking portion comprising a first thickness,
a second light blocking portion disposed adjacent to the first light blocking portion, the second light blocking portion comprising a variable thickness that arcuately varies from the first thickness to a second thickness less than the first thickness, and
a column spacer portion disposed adjacent to the second light blocking portion, the column spacer portion being protruded with respect to the first light blocking portion.

16. The display substrate of claim 15, wherein:
the second light blocking portion integrally extends from the column spacer portion; and
the first light blocking portion integrally extends from the second light blocking portion.

17. A mask for a display substrate, comprising:
a first portion configured to transmit incident light at a first transmittance;
a second portion disposed adjacent to the first portion, the second portion being configured to transmit incident light at a second transmittance, the second transmittance being less than the first transmittance; and
a third portion disposed adjacent to the second portion, the third portion being configured to transmit incident light at a third transmittance, the third transmittance being greater than the first transmittance,
wherein the second portion surrounds the third portion, and
wherein the first portion surrounds the second portion.

18. The mask of claim 17, wherein the third transmittance is about 100%.

19. The mask of claim 17, wherein the third portion comprises a circular cross-sectional shape.

20. A mask for a display substrate, comprising:
a first portion configured to transmit incident light at a first transmittance;
a second portion disposed adjacent to the first portion, the second portion being configured to transmit incident light at a second transmittance, the second transmittance being less than the first transmittance; and
a third portion disposed adjacent to the second portion, the third portion being configured to transmit incident light at a third transmittance, the third transmittance being greater than the first transmittance,
wherein the second transmittance is zero.

21. A mask for a display substrate, comprising:
a first portion configured to transmit incident light at a first transmittance;
a second portion disposed adjacent to the first portion, the second portion being configured to transmit incident light at a second transmittance, the second transmittance being less than the first transmittance;
a third portion disposed adjacent to the second portion, the third portion being configured to transmit incident light at a third transmittance, the third transmittance being greater than the first transmittance;
a fourth portion disposed adjacent to the first portion, the fourth portion being configured to transmit incident light at a fourth transmittance, the fourth transmittance being less than the first transmittance; and
a fifth portion disposed adjacent to the fourth portion, the fifth portion being configured to transmit incident light at a fifth transmittance, the fifth transmittance being greater than the first transmittance.

22. The mask of claim 21, wherein the fifth transmittance is less than the third transmittance.

23. The mask of claim 21, wherein the fourth transmittance is substantially the same as the second transmittance.

24. A method, comprising:
forming, on a substrate, a first light blocking portion comprising a first thickness;
forming, on the substrate, a second light blocking portion adjacent to the first light blocking portion, the second light blocking portion comprising a second thickness, the second thickness being less than the first thickness; and
forming, on the substrate, a column spacer portion adjacent to the second light blocking portion, the column spacer portion comprising a third thickness, the third thickness being greater than the first thickness,
wherein the second light blocking portion surrounds the column spacer portion, and
wherein the first light blocking portion surrounds the second light blocking portion.

25. The method of claim 24, wherein:
the second light blocking portion integrally extends from the column spacer portion; and
the first light blocking portion integrally extends from the second light blocking portion.

26. The method of claim 24, wherein the second light blocking portion comprises a variable thickness that varies as the second light blocking portion extends from the first light blocking portion towards the column spacer portion.

27. The method of claim 24, wherein forming the first light blocking portion, the second light blocking portion, and the third light blocking portion comprises:
depositing material on the substrate; and
exposing at least some of the material to light through a mask,
wherein the mask comprises:
a first portion shaped to form the first light blocking portion,
a second portion shaped to form the second light blocking portion, and
a third portion shaped to form the column spacer portion.

28. The method of claim 27, wherein:
the first portion transmits the light at a first transmittance;
the second portion transmits the light at a second transmittance, the second transmittance being less than the first transmittance; and
the third portion transmits the light at a third transmittance, the third transmittance being greater than the first transmittance.

29. The method of claim 28, wherein the third transmittance is about 100%.

30. The method of claim 24, further comprising:
forming a signal line on the substrate,
wherein the first light blocking portion, the second light blocking portion, and the column spacer portion cover the signal line.

31. The method of claim 30, wherein the signal line corresponds to a gate line.

32. The method of claim 24, further comprising:
forming color filters on the substrate,
wherein the first light blocking portion, the second light blocking portion, and the column spacer portion cover boundaries between the color filters.

33. The method of claim 24, wherein the first light blocking portion, the second light blocking portion, and the column spacer portion are simultaneously formed.

34. A method, comprising:
forming, on a substrate, a first light blocking portion comprising a first thickness;
forming, on the substrate, a second light blocking portion adjacent to the first light blocking portion, the second light blocking portion comprising a second thickness, the second thickness being less than the first thickness; and
forming, on the substrate, a column spacer portion adjacent to the second light blocking portion, the column spacer portion comprising a third thickness, the third thickness being greater than the first thickness,
wherein a width of the second light blocking portion is equal to or less than 5 µm.

35. A method, comprising:
forming, on a substrate, a first light blocking portion comprising a first thickness;
forming, on the substrate, a second light blocking portion adjacent to the first light blocking portion, the second light blocking portion comprising a second thickness, the second thickness being less than the first thickness; and
forming, on the substrate, a column spacer portion adjacent to the second light blocking portion, the column spacer portion comprising a third thickness, the third thickness being greater than the first thickness,
wherein forming the first light blocking portion, the second light blocking portion, and the third light blocking portion comprises:
depositing material on the substrate; and
exposing at least some of the material to light through a mask,
wherein the mask comprises:
a first portion shaped to form the first light blocking portion,
a second portion shaped to form the second light blocking portion, and
a third portion shaped to form the column spacer portion,
wherein:
the first portion transmits the light at a first transmittance;
the second portion transmits the light at a second transmittance, the second transmittance being less than the first transmittance; and
the third portion transmits the light at a third transmittance, the third transmittance being greater than the first transmittance, and
wherein the second transmittance is zero.

36. A method, comprising:
forming, on a substrate, a first light blocking portion comprising a first thickness;

forming, on the substrate, a second light blocking portion adjacent to the first light blocking portion, the second light blocking portion comprising a second thickness, the second thickness being less than the first thickness; and forming, on the substrate, a column spacer portion adjacent to the second light blocking portion, the column spacer portion comprising a third thickness, the third thickness being greater than the first thickness, wherein the second light blocking portion comprises a variable thickness that varies as the second light blocking portion extends from the first light blocking portion towards the column spacer portion, and wherein the second light blocking portion comprises a variable thickness that arcuately varies between the first thickness and the second thickness.

* * * * *